United States Patent Office 3,462,507
Patented Aug. 19, 1969

---

3,462,507
PREPARATION OF ALKALI METAL ACETYLIDES
Samuel Kahn, Rutherford, N.J., assignor to Universal Oil Products Company, Des Plaines, Ill., a corporation of Delaware
No Drawing. Filed Nov. 16, 1966, Ser. No. 594,671
Int. Cl. C07f 1/06
U.S. Cl. 260—665                 3 Claims

---

ABSTRACT OF THE DISCLOSURE

Alkali metal acetylides can be prepared by the reaction of an alkali metal hydroxide, such as potassium hydroxide, with an acetylenic compound, such as acetylene, in an inert reaction diluent of the dibutyl ether of diethylene glycol. The alkali metal acetylides are useful in preparing acetylenic alcohols.

---

This invention, relates to the preparation of alkali metal acetylides and, more particularly, to the preparation of such compounds by the reaction of an alkali metal hydroxide with an acetylenic compound in the presence of the dibutyl ether of diethylene glycol.

Alakli metal acetylides are very important compounds having wide use in the chemical industry as reactive intermediates, such as, for example, in the preparation of acetylenic alcohols by reaction with carbonyl compounds or in the preparation of acetylenic hydrocarbons by reaction with alkyl halides. The preparation of these compounds usually is effected by reacting an alkali metal hydroxide with the desired acetylenic compound. This well known reaction suffers, however, from a number of serious disadvantages, the foremost of which are that the product of the reaction is not usually formed in good yields and is not usually sufficiently reactive for further use. This inactivity of the alkali metal acetylide is caused by a variety of factors including an undesirable particle size for the formed acetylide as well as the incomplete reaction of the hydroxide and acetylenic compound. To overcome these serious disadvantages, the reaction of the alkali metal hydroxide and acetylenic compound usually is effected in the presence of an inert diluent. While an extremely large class of materials have been used for this purpose including liquid ammonia, aliphatic or aromatic hydrocarbons, ether or glycol compounds, none have been completely successful in providing readily usable, highly reactive acetylides. Moreover, while the use of certain of these materials has provided sufficiently reactive acetylides, they nevertheless are unsuitable because they interfere with the further reaction of the acetylide, as in the case of liquid ammonia, and consequently must be first separated from the acetylide prior to the further reaction thereof. It has now been discovered, however, that the dibutyl ether of diethylene glycol may be used as the diluent for the reaction to prepare highly reactive alkali metal acetylides and, moreover, such diluent need not be separated from the formed acetylide prior to the further reaction thereof.

Accordingly, it is an object of this invention to provide a method for preparing highly reactive alkali metal acetylides. A further object is to provide a method for preparing such compounds by the reaction of an alkali metal hydroxide and an acetylenic compound using the dibutyl ether of diethylene glycol as a reaction diluent whereby a highly reactive acetylide is obtained which does not require separation from such diluent prior to the further use thereof. These and other objects of this invention will be apparent from the following further detailed description thereof.

The preparation of highly reactive alkali metal acetylides is effected according to the method of this invention by using the dibutyl ether of diethylene glycol as the reaction diluent for the reaction of alkali metal hydroxides with acetylenic compounds. The alkali metal hydroxides which may be used in the reaction include the hydroxides of lithium, sodium, potassium, rubidium or cesium. Of these various hydroxides, however, the best results are generally obtained with potassium hydroxide and it is accordingly the preferred alkali metal hydroxide for use in the method of this invention. The acetylenic compound which may be reacted with the alkali metal hydroxide may be represented by the formula:

$$R-C\equiv C-H \qquad (I)$$

where R is selected from the group consisting of hydrogen and a hydrocarbon radical. As used herein, the term hydrocarbon radical includes alkyl, alkenyl, alkynyl, cycloalkyl, cycloalkenyl, aralkyl and aryl. Generally, the hydrocarbon radical may contain up to about 20 carbon atoms although hydrocarbon radicals containing up to about 10 carbon atoms are preferred. Examples of the acetylenic compound of Formula I includes acetylene, that is where R is hydrogen, as well as compounds where R is a hydrocarbon radical such as alkyl, for example, methyl, ethyl or propyl; alkenyl such as vinyl; cycloalkyl or cycloalkenyl, for example, cyclohexane or cyclohexene; or aryl such as phenyl. Of the various acetylenic compounds which may be used acetylene is preferred, particularly to make dialkali metal acetylides such as dipotassium acetylide for preparing acetylenic diols. The alkali metal acetylides which may be prepared by reacting an alkali metal hydroxide with an acetylenic compound in the presence of the dibutyl ether of diethylene glycol according to the method of this invention may be represented by the following formula:

$$A-C\equiv C-B \qquad (II)$$

where A is an alkali metal, such as sodium, potassium or lithium, and B is selected from the group consisting of an alkali metal, hydrogen and a hydrocarbon radical. When the acetylenic compound of Formula I is acetylene, that is where R is hydrogen, then the alkali metal acetylide of Formula II prepared in the reaction may be either a mono- or dialkali metal acetylide such as mono- or dipotassium acetylide. When the R of the acetylenic compound of Formula I is a hydrocarbon radical, then the B of the alkali metal acetylide of Formula II prepared in the reaction will be the same radical. Examples of such compounds represented by Formula II include compounds where A is potassium or sodium and B is an alkyl group such as methyl, ethyl, or propyl; an alkenyl group such as vinyl; a cycloalkyl or cycloalkenyl group such as cyclohexane or cyclohexene; or an aryl group such as phenyl. Of the various alkali metal acetylides which may be prepared by the method of this invention mono- or dipotassium acetylide is preferred, particularly for the preparation of acetylenic alcohols by reaction with carbonyl compounds.

The preparation of alkali metal acetylides according to the method of this invention is effected, in general, in a two-step procedure which involves basically first mixing the alkali metal hydroxide with the dibutyl ether of diethylene glycol followed by contacting the alkali metal hydroxide while it is suspended in the dibutyl ether of diethylene glycol with the desired acetylenic compound. In effecting the first step of the method, that is, the mixing of the alkali metal hydroxide with the dibutyl ether of of diethylene glycol, the hydroxide, preferably potassium hydroxide, is added to the dibutyl ether of diethylene glycol as a solid in substantially anhydrous form although the moisture content may range up to about 10 to 15 weight percent such as in the case of commercial potassium hydroxide. A moisture content above about this level should be avoided, however, as the mixture of dibutyl ether of diethylene glycol and hydroxide should be substantially anhydrous for the next step of the procedure if a highly reactive acetylide is to be obtained. After or during the addition of the hydroxide to the dibutyl ether of diethylene glycol the temperature of the mixture is raised to a level sufficient to melt all or substantially all of the hydroxide. This temperature will vary, of course, depending upon the particular hydroxide and its state of hydration and, in the case of commercially available potassium hydroxide, this temperature should range, at least, above about 90° to 100° C. It is usually desirable, however, to increase the temperature above this minimum level and, again, in the case of potassium hydroxide, it is preferred that this temperature be about 120° to 180°, or about 150° C. After the mixture is maintained at this temperature for a period sufficient to melt the hydroxide, the resulting two-liquid phase mixture is then rapidly cooled with stirring to a temperature below about 100° C. or, more preferably, below about 60° C. The resultant suspension of very fine hydroxide particles in the dibutyl ether of diethylene glycol is then ready for the second step of the method of reacting the hydroxide with the acetylenic compound.

In carrying out the second step of the method, the temperature of the suspension of the alkali metal hydroxide and the dibutyl ether of diethylene glycol is adjusted to the appropriate range and then the acetylenic compound is contacted with the suspension to form the alkali metal acetylide. The procedure of contacting the acetylenic compound with the suspension may be varied and depends upon whether the acetylenic compound is gaseous, liquid or solid at the contacting temperature. For example, in the case where gaseous acetylene is the acetylenic compound, it may simply be charged into contact with the suspension until the desired quantity of acetylene has been absorbed. Due to the method of preparing the suspension of the alkali metal hydroxide in the dibutyl ether of diethylene glycol according to this invention, the reaction period with the acetylenic compound is usually very short, for example, it typically ranges from a few minutes to one or two hours. The resultant suspension of finely divided, highly reactive alkali metal acetylide in the dibutyl ether of diethylene glycol may then be directly used for further reaction of the acetylide such as with a carbonyl compound to form acetylenic alcohols without any prior separation of the dibutyl ether of diethylene glycol.

The conditions used in the method of this invention for reacting the suspension of alkali metal hydroxide in the dibutyl ether of diethylene glycol with the acetylenic compound may be varied. Generally, the quantity of the dibutyl ether of diethylene glycol present should, at least, be sufficient to provide a readily stirrable mixture of the alkali metal hydroxide and resultant alkali metal acetylide. The minimum quantity for this purpose will be dependent upon such variables as the reaction temperature, the desired reaction rate, and the particular alkali metal hydroxide and acetylenic compound being reacted. Generally, when reacting potassium hydroxide and acetylene, for example, the quantity of the dibutyl ether of diethylene glycol used should range from about 200 to 2000 grams or more, preferably 750 to 1500 grams per one gram mol of the acetylene. The temperature at which the reaction of the alkali metal hydroxide and the acetylenic compound is effected usually ranges from about 15° to 75° C. with a range of from about 20° to 60° C. being preferred. The quantity of the alkali metal hydroxide and acetylenic compound reacted may be varied with stoichiometric quantities being conveniently used in most instances. Generally, however, to insure complete reaction of the acetylenic compound and to form a highly reactive acetylide suspension, the alkali metal hydroxide should be used in excess, preferably up to about 100 percent of theory.

The following example is offered to illustrate the method of this invention. It is not intended, however, to limit the invention to the particular alkali metal acetylide prepared, or the reaction conditions or procedures recited therein.

EXAMPLE

Dipotassium acetylide was prepared according to the method of this invention by the following procedure:

To a reactor equipped with heating and stirring means were charged about 1240 grams of the dibutyl ether of diethylene glycol. With stirring, about 248 grams (4 mols) of flaked potassium hydroxide (90 weight percent) were added. The mixture was then heated to a temperature of about 145° C. with the formation of two liquid phases. The heating was stopped and the stirred two-phase mixture was cooled to about 25° C. The mixture at this point was a readily stirrable gel-like suspension of very fine potassium hydroxide particles in the dibutyl ether of diethylene glycol. Acetylene gas was charged under a nitrogen atmosphere to the reactor until approximately 26 grams (1 mol) was absorbed by the suspension, a period requiring about 150 minutes. At the completion of the acetylene addition the suspension of resultant dipotassium acetylide was a readily stirrable slurry. To illustrate the high reactivity of the dipotassium acetylide, it was directly used to prepare an acetylenic alcohol without separation from the dibutyl ether of diethylene glycol. This was effected by adding 290 grams (5 mols) of acetone to the stirred suspension over a period of about 45 minutes with the temperature at 25° C. The resultant, readily stirrable gelatinous mixture was stirred for about an hour and then 570 grams of ice water were added. The resultant aqueous alkaline phase of the reaction mixture was separated from the product phase by decantation. Analysis of the product by gas liquid chromatography indicated that the yield of the 2,5-dimethyl-3-hexyne-2,5-diol was above about 90 percent of theory.

I claim as my invention:

1. The method of preparing an alkali metal acetylide by the reaction of potassium hydroxide with an acetylenic compound which comprises:
   (1) mixing the potassium hydroxide in the dibutyl ether of ethylene glycol and heating the mixture to a temperature in the range of from 90° to 180° C., and at least sufficient to melt the hydroxide,
   (2) cooling the resultant two-liquid phase mixture with mixing to a temperature below about 60° C., and
   (3) reactively contacting the resultant suspension of finely divided potassium hydroxide with the acetylenic compound at a temperature ranging from 20° to about 60° C. to form the alkali metal acetylide.

2. The method according to claim 1 characterized in that a mixture of potassium hydroxide and dibutyl ether of diethylene glycol is heated to a temperature of at least above about 150° C. and is thereafter cooled to a temperature of at least below about 60° C.

3. The method according to claim 1 characterized in that the preparation of dipotassium acetylide is effected by reacting potassium hydroxide with acetylene at a temperature of from about 20° to 60° C.

References Cited

UNITED STATES PATENTS

| | | | |
|---|---|---|---|
| 2,455,058 | 11/1948 | Herman | 260—665 |
| 2,965,684 | 12/1960 | Fruhwirth et al. | 260—665 |
| 3,225,110 | 12/1965 | Kurtz | 260—665 |

OTHER REFERENCES

Johnston, Glycols, Am. Chem. Soc. Monograph No. 114, Reinhold Publishing Corp., New York, N.Y., 1952, p. 163.

Ryotani, Chem. Abst. vol. 54, col. 23616–17, Abstract of Nippon Kaguku Zasshi, 81 (1960).

TOBIAS E. LEVOW, Primary Examiner

A. P. DEMERS, Assistant Examiner

U.S. Cl. X.R.

23—208; 260—635, 638